United States Patent
Sawamura

[11] Patent Number: 5,999,789
[45] Date of Patent: Dec. 7, 1999

[54] FIXING DEVICE FOR AN IMAGE FORMING APPARATUS

[75] Inventor: Eiji Sawamura, Kanagawa, Japan

[73] Assignee: Ricoh Company, Ltd., Tokyo, Japan

[21] Appl. No.: 09/177,553

[22] Filed: Oct. 23, 1998

[30] Foreign Application Priority Data

Oct. 23, 1997 [JP] Japan ................................. 9-309376
Oct. 20, 1998 [JP] Japan ................................ 10-316955

[51] Int. Cl.$^6$ .................................................. G03G 15/20
[52] U.S. Cl. ...................... 399/330; 74/421 R; 219/216; 399/328
[58] Field of Search ................................... 399/328, 330, 399/333, 67, 69; 219/216, 469; 74/421 R

[56] References Cited

U.S. PATENT DOCUMENTS

| | | | |
|---|---|---|---|
| 3,809,855 | 5/1974 | Neal | 219/216 |
| 4,714,819 | 12/1987 | Yamashita | 219/216 |
| 4,829,842 | 5/1989 | Schiel | 74/421 R |
| 5,281,793 | 1/1994 | Gavin et al. | 219/216 |
| 5,301,000 | 4/1994 | Heigl | 399/122 |
| 5,365,320 | 11/1994 | Takano et al. | 399/322 |
| 5,765,075 | 6/1998 | Yamamoto | 399/69 |
| 5,778,278 | 7/1998 | Jeon | 399/330 X |
| 5,835,835 | 11/1998 | Nishikawa et al. | 399/328 |

FOREIGN PATENT DOCUMENTS

| | | | |
|---|---|---|---|
| 286846 | 2/1991 | Germany | 74/421 R |
| 5-060180 | 3/1993 | Japan | 74/421 R |
| 6-272738 | 9/1994 | Japan | 74/421 R |

*Primary Examiner*—Matthew S. Smith
*Attorney, Agent, or Firm*—Oblon, Spivak, McClelland, Maier & Neustadt, P.C.

[57] ABSTRACT

A fixing device for thermally fixing a toner image formed on a recording medium by an image forming apparatus is disclosed. A heat roller included in the fixing device is prevented from moving in its axial direction or thrust direction without causing any leak to occur. While a heating layer and a temperature sensor are electrically isolated from each other, the temperature sensor can accurately sense the surface temperature of the heat roller without damaging the surface of the heat roller.

11 Claims, 10 Drawing Sheets

FIXING DEVICE FOR AN IMAGE FORMING APPARATUS

BACKGROUND OF THE INVENTION

1. Field of the Invention

The present invention relates to a copier, printer, facsimile apparatus or similar electrophotographic image forming apparatus and, more particularly, to a fixing device for thermally fixing a toner image on a recording medium.

2. Discussion of the Background

It is a common practice with an electrophotographic image forming apparatus to form an electrostatic latent image representative of a document image on the surface of a photoconductive element charged to a preselected polarity beforehand. The latent image is developed by a developing device located at a preselected position around the photoconductive element. Specifically, powdery charged toner is fed from the developing device to the phoconductive element in order to develop the latent image. The resulting toner image is brought to an image transfer station by the photoconductive element in rotation and transferred to a paper or similar recording medium also conveyed to the image transfer station. The toner image carried on the paper is fixed by a fixing device.

Generally, the fixing device is made up of a heat roller having a heat source therein and a press roller facing and pressed against the heat roller. The heat roller and press roller thermally fix the toner image on the paper being passed between the two rollers. Tie prerequisite with the heat roller is that it accurately contacts the image area of the paper and surely fixes the toner image on the paper. To meet this requisite, the heat roller is mounted on, e.g., the housing of the apparatus in such a manner as not to move in its axial direction or thrust direction. Means for restricting the movement of the heat roller in the thrust direction has been proposed in various forms in the past. Japanese Utility Model Laid-Open Publication No. 61-19265, for example, teaches a configuration in which a generally C-shaped stop ring in the form of a metal spring is resiliently fitted on the outer periphery of a heat roller. The stop ring abuts against a bearing and a support member supporting the heat roller so as to restrict the axial displacement of the roller.

Usually, the heat source disposed in the heat roller is implemented by a halogen lamp heater or similar heater capable of heating the roller by radiation. However, the problem with this kind of heat source is that a substantial interval is necessary between the time when the heater, i.e., the power switch of the apparatus, is turned on and the time when the surface of the heat roller reaches a preselected fixing temperature. That is, a long preheating time or warm-up time is necessary. In light of this, there has recently been proposed to form a heating layer heating in response to a current on the surface of the heat roller, as taught in, e.g., Japanese Patent Laid-Open Publication No. 9-127814. The heating layer directly heats the surface of the heat roller.

In a fixing device of the type using a heating layer as stated above, the surface temperature of the heat roller is usually controlled to a preselected value by the control of current supply to the heating layer. Specifically, the current supply to the heating layer 114 is controlled in accordance with the output of a thermistor or similar contact type temperature sensor contacting the surface of the heat roller. However, when the stop ring scheme is applied to the fixing device of the type accelerating the warm-up of the heat roller with the heating layer covering the surface of the roller, the stop ring and heating layer contact each other and bring about a leak. Particularly, when a leak occurs between the thermistor and the heating layer, current flows to the thermistor and prevents it from sensing temperature with accuracy.

SUMMARY OF THE INVENTION

It is therefore an object of the present invention to provide a fixing device for an image forming apparatus capable of restricting the movement of a heat roller in the thrust direction without causing any leak to occur.

It is another object of the present invention to provide a fixing device for an image forming apparatus capable of accurately sensing the surface temperature of a heat roller without damaging the heat roller while guaranteeing electric insulation between a heating layer and a temperature sensor.

In accordance with the present invention, a fixing device for thermally fixing a toner image formed on a recording medium includes heat roller heated by a heating body. A press roller faces and is pressed against the heat roller and cooperates with the heat roller to thermally fix the toner image when the recording medium is passed therebetween. A restricting member restricts the movement of the heat roller in the thrust direction. The restricting member is included in a driveline for transmitting a torque to the heat roller.

Also, in accordance with the present invention, a fixing device for thermally fixing a toner image carried on a recording medium includes a heat roller heated by a heating body. A press roller faces and is pressed against the heat roller and cooperates with the heat roller to thermally fix the toner image when the recording medium is passed therebetween. A resin sheet formed of a low friction material contacts the outer periphery of the heat roller. An electric insulation layer is formed on the resin sheet. An elastic protection layer is formed on the electric insulation layer. A temperature sensor intervenes between the electric insulation layer and the elastic protection layer for sensing the surface temperature of the heat roller.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1A:
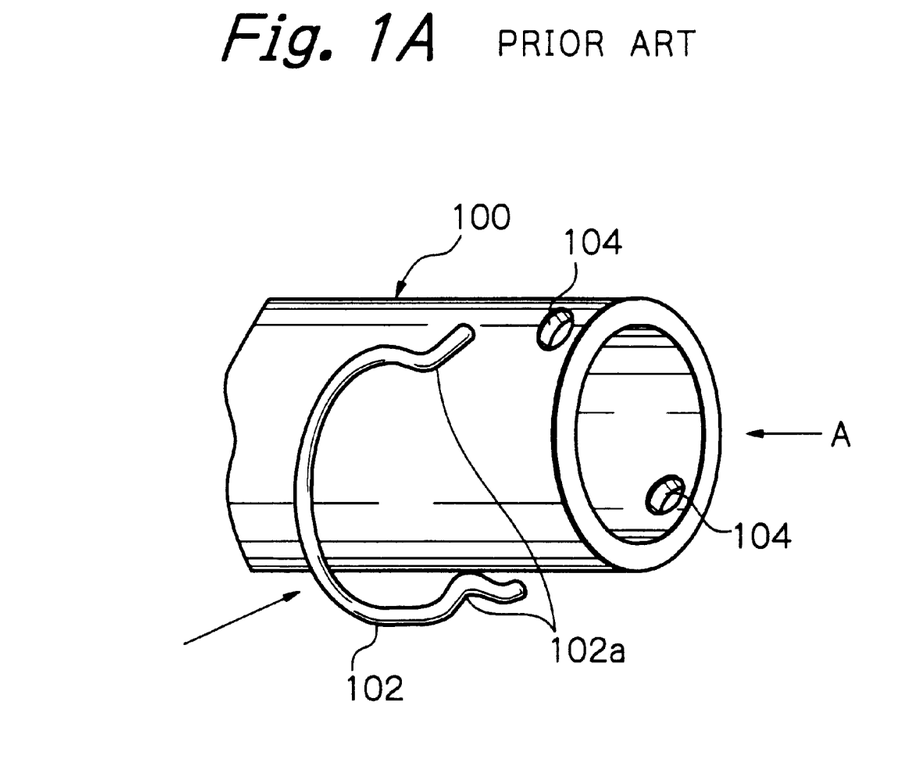
FIG. 1A is a perspective view showing conventional means for restricting the movement of a heat roller in the thrust direction.

To better understand the present invention, brief reference will be made to a conventional fixing device for an image forming apparatus. First, means for restricting the movement of a fixing roller in the thrust direction taught in Japanese Utility Model Laid-Open Publication No. 61-19265 mentioned earlier will be described with reference to FIGS. 1A and 1B. As shown in FIG. 1A, a generally C-shaped stop ring 102 is implemented by a metal spring and resiliently fitted on the outer periphery of a heat roller 100. The stop ring 102 abuts against a bearing and a support member supporting the heat roller 100 so as to restrict the axial displacement of the roller 100.

Figure 1B:
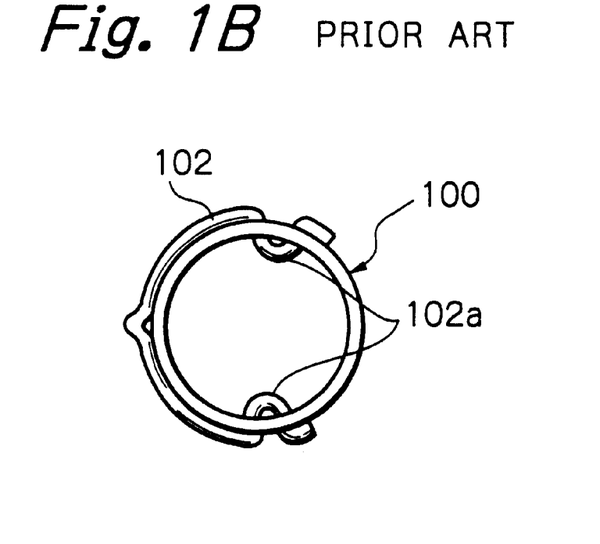
FIG. 1B is a view as seen in a direction indicated by an arrow A in FIG. 1A.

Specifically, at least two holes 104 are formed in the circumferential wall of the heat roller 100 at the same position in the axial direction of the roller 100. The stop ring 102 includes two constricted portions 102a corresponding in position to the two holes 104. As shown in FIG. 1B, the constricted portions 102a are respectively fitted in the holes 104 and protrude into the heat roller 100. In this condition, the stop ring 102 is resiliently affixed to the heat roller 100.

Figure 2A:
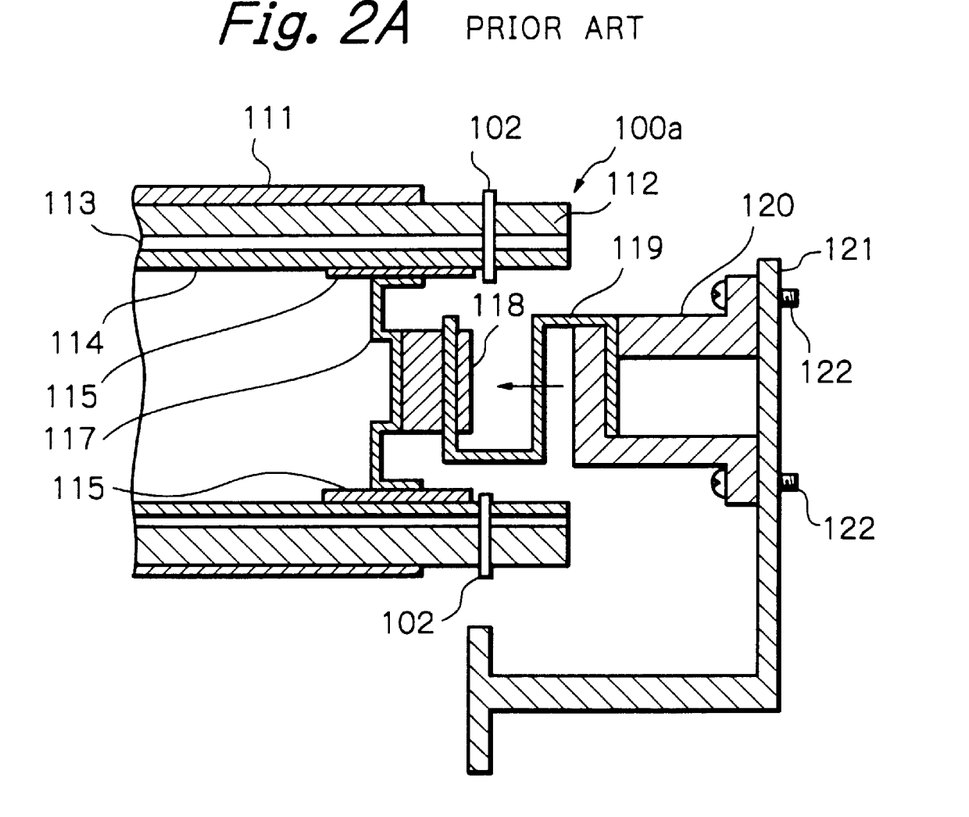
FIG. 2A is a section showing a conventional heat roller including a heating layer.

FIG. 2A shows a heat roller disclosed in Japanese Patent Laid-Open Publication No. 9-127814 also mentioned earlier and including a heating element covering the surface of a heat roller. The heating element generates heat in response to a current and directly heats the surface of the heat roller. Specifically, the heat roller, generally 100a, includes a hollow cylindrical rotatable base 112 formed of aluminum, iron or similar metal. A parting layer 111 is formed on the outer periphery of the base 112 and formed of, e.g., PTFE (Poly Tetra Fluoro Ethylene). An insulation layer 113 and a heating layer 114 are sequentially laminated on the inner periphery of the base 112. A current receive portion 115 is formed on the heating layer 114 and implemented by, e.g., copper foil. A current feed cap 117 is affixed to the current receive portion 115 within the heat roller 100a. The receive portion 115 and feed cap 117 are therefore rotatable integrally with the hollow base 112.

A feed brush 118 is held in contact with the feed cap 117 for applying a voltage to the cap 117. A leaf spring 119 constantly biases the feed brush 118 toward the feed cap 117 in order to guarantee electrical connection between the feed cap 117 and the feed brush 118. The leaf spring 119 is mounted on an electrode holder 120 formed of resin. The electrode holder 120 is in turn fastened to a holder 121 by screws 122.

Figure 2B:
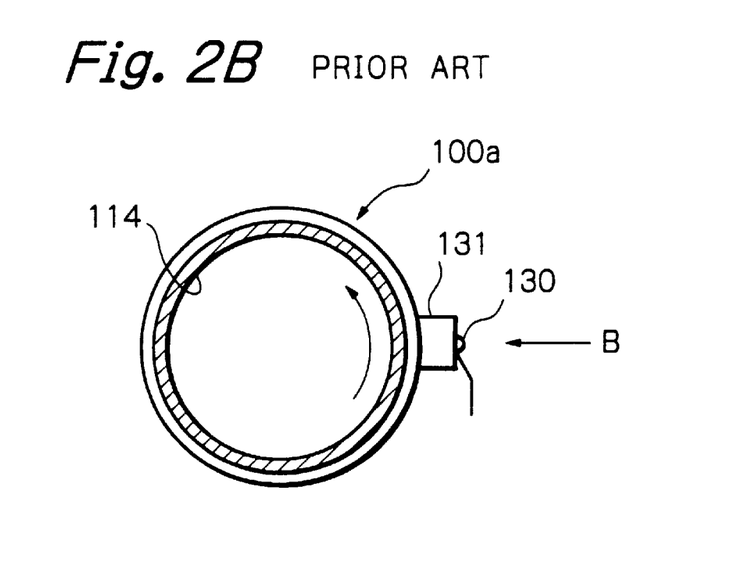
FIG. 2B is a section showing how a temperature sensor contacts the heat roller of FIG. 2A.

FIG. 2B shows a conventional arrangement for controlling the current supply to the above heating layer 114 in accordance with the output of a thermistor or similar contact type temperature sensor. As shown, a thermistor 130 responsive to the temperature of the heat roller 100a is held in contact with the outer periphery of the heat roller 100a with the intermediary of an electric insulation layer 131. The insulation layer 131 electrically isolates the thermistor 130 from the heating layer 114 to which a high voltage is applied. This protects the operator apt to touch circuitry connected to the thermistor 130 from an electric shock.

However, the conventional implementations described with reference to FIGS. 1A, 1B, 2A and 2B have the problems discussed earlier. Specifically, assume that the stop ring scheme shown in FIGS. 1A and 1B is applied to the fixing device of the type accelerating the warm-up of the heat roller with the heating layer covering the surface of the roller. Then, as shown in FIG. 2A, the stop ring 102 and heating layer 114 contact each other, resulting in a leak.

On the other hand, in the configuration shown in FIG. 2B in which the insulation layer 131 intervenes between the thermistor 130 and the heating layer 114, the heat roller 100a and insulation layer 131 slip on each other when a force pressing the layer 131 against the roller 100a acts (direction B). As a result, the PTFE layer on the heat roller 110a is apt to suffer from scratches, rendering image formation defective. Particularly, when a leak occurs between the thermistor 130 and the heating layer 114, a current flows to the thermistor 130 and prevents it from sensing temperature with accuracy.

Figure 3:
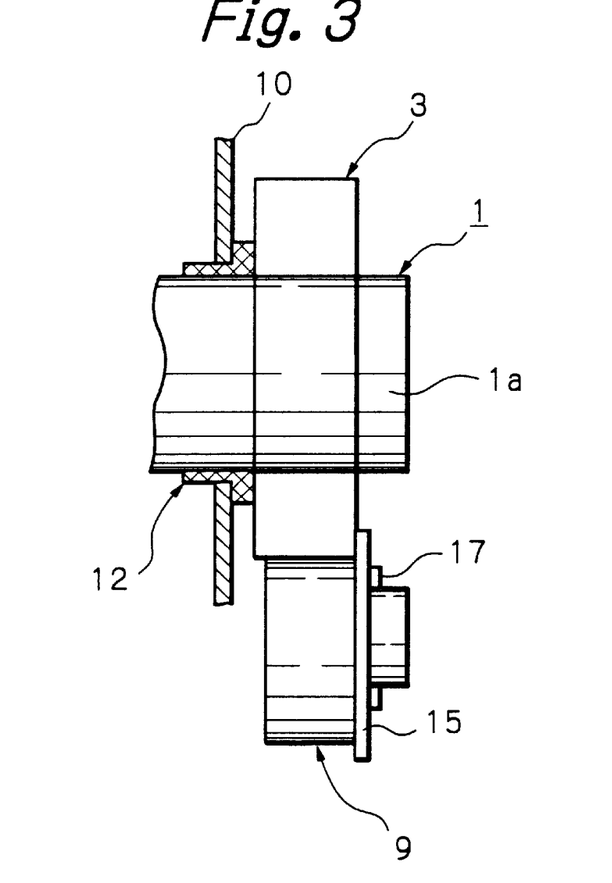
FIG. 3 is a section showing one end portion of a heat roller included in a fixing device embodying the present invention.
Figure 6:
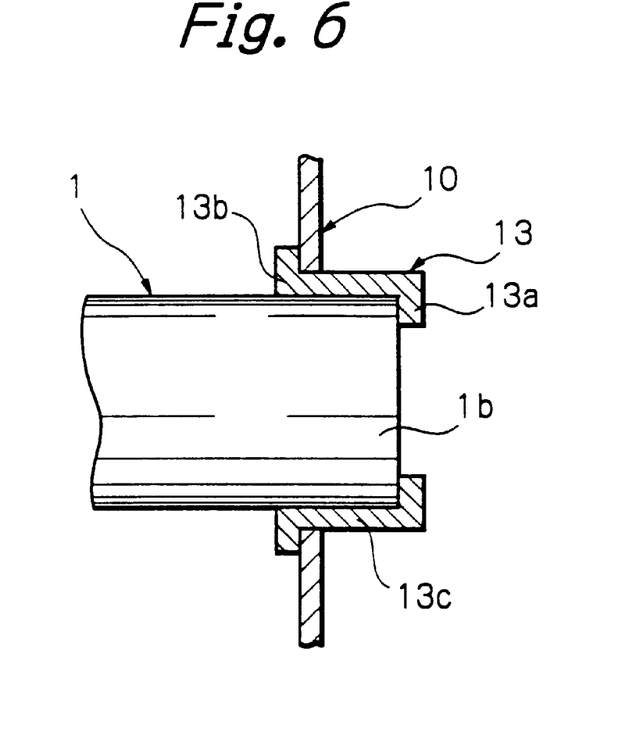
FIG. 6 is a section showing the other end portion of the heat roller.

Referring to FIG. 3, a heat roller included in a fixing device embodying the present invention is shown and generally designated by the reference numeral 1. As shown, the heat roller 1 includes a hollow cylindrical base formed of, e.g., an aluminum alloy. The heat roller 1 and a press roller 2 (see FIG. 8) are pressed against each other. A recording medium carrying a toner image thereon is passed between the two rollers 1 and 2 to have the toner image thermally fixed thereon. As shown in FIGS. 3 and 6, opposite ends 1a and 1b of the heat roller 1 are rotatably supported by slide bearings 12 and 13, respectively. The slide bearings 12 and 13 are respectively mounted on opposite side walls 10 included in the body of an image forming apparatus including the fixing device. A heating layer 4 (see FIG. 8) is formed on a portion of the inner periphery of the base intervening between, e.g., the bearings 12 and 13 and expected to contact a paper or similar recording medium. A parting layer formed of PFA (Per Fluoro Alcoxy fluorine-contained resin) or PTFE by way of example is formed on the outer periphery of the base. In the illustrative embodiment, the heat roller 1 has a wall thickness of less than 0.8 mm inclusive.

Figure 9:
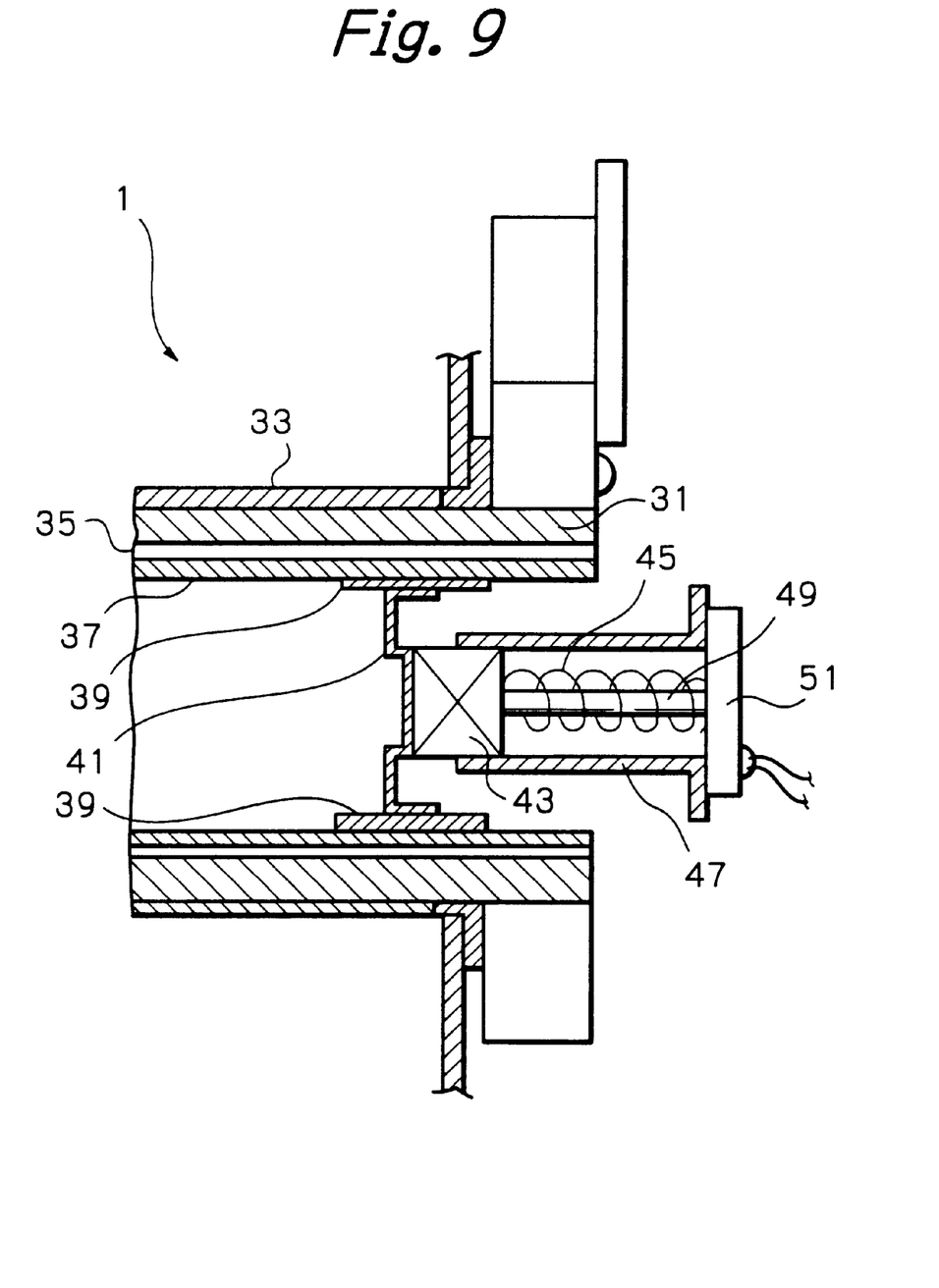
FIG. 9 is a section showing a current feed section included in one end portion of the heat roller.

An arrangement for applying a voltage to the heating layer 4 will be described hereinafter. As shown in FIG. 9, the heat roller 1 includes a hollow cylindrical rotatable base 31 formed of aluminum, iron or similar metal. A PTFE or similar parting layer 33 is formed on the outer periphery of the base 31. An insulation layer 35 and a heating layer 37 are laminated on the inner periphery of the core 31, as illustrated. A receive portion 39 in the form of, e.g., copper foil is positioned on the heating layer 35. A feed cap 41 is affixed to the receive portion 39 within the heat roller 1. The receive portion 39 and feed cap 41 are therefore rotatable integrally with the base 31.

A feed brush 43 is held in contact with the feed cap 41 for applying a voltage to the cap 41. A compression spring 45 constantly biases the feed brush 43 toward the feed cap 45 in order to guarantee electrical connection between the feed cap 41 and the feed brush 43. The compression spring 45 is guided by an electrode holder 47 formed of resin and surrounds a conductor 49. The conductor 49 is connected to a power source via a holder 51. A voltage to be applied to the conductor 49 is control led in accordance with temperature being sensed by a temperature sensor 22 which will be described later.

Figure 10:
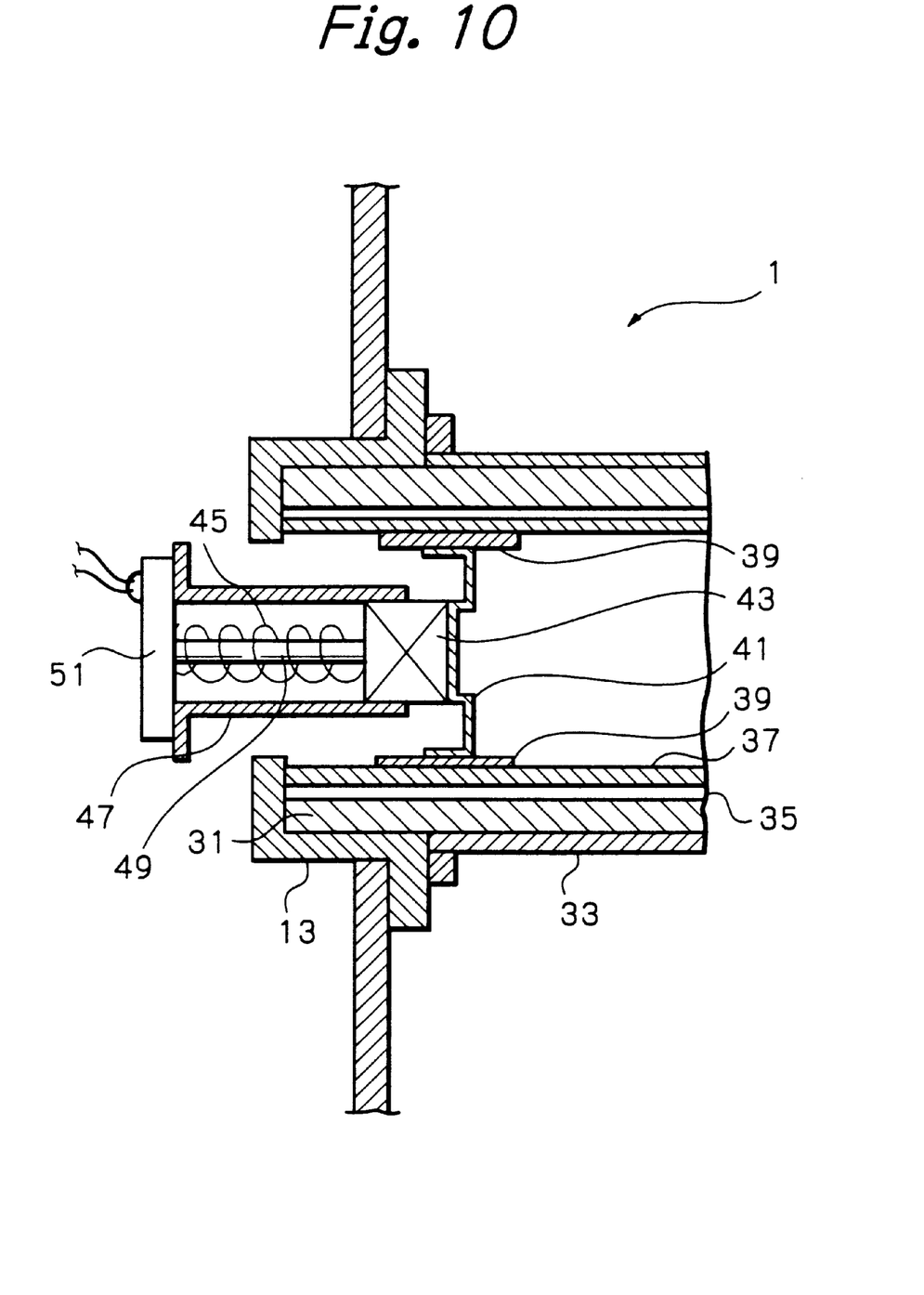
FIG. 10 is a section showing a current feed section included in the other end portion of the heat roller.

As shown in FIG. 10, a feed brush 43 is also located at the other end of the heat roller 1 for electric conduction to the heating layer 37 in the same manner as in FIG. 9. In this configuration, a current flows from one end to the other end of the heat roller 1. In FIG. 10, the same structural elements as the elements shown in FIG. 9 are designated by identical reference numerals and will not be described specifically in order to avoid redundancy.

Figure 4:
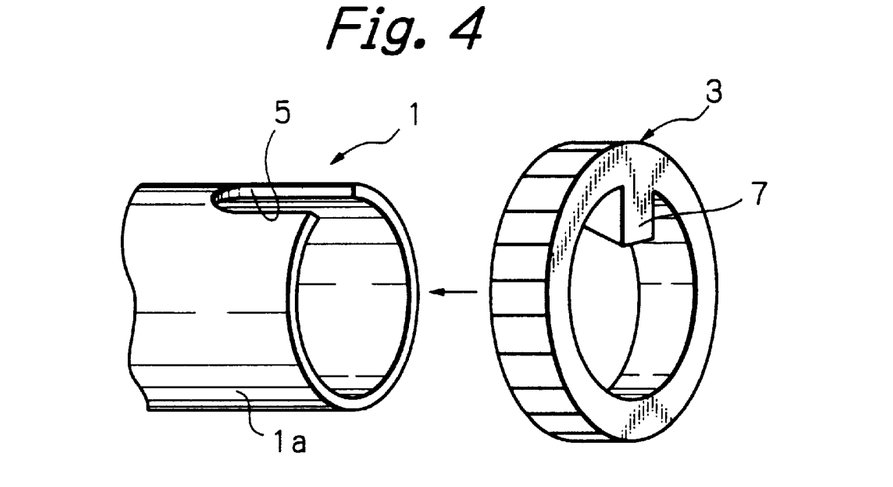
FIG. 4 is an exploded perspective view showing the end portion of the heat roller shown in FIG. 3 together with a driven gear.

Referring again to FIG. 3, one end 1*a* of the heat roller 1 protrudes from the bearing 12 to the outside of the side wall 10. An annular driven gear 3 is affixed to the end 1*a* of the heat roller 1. Specifically, as shown in FIG. 4, the end 1*a* of the heat roller 1 is formed with a notch 5 while the driven gear 3 is formed with a lug 7 in its inner periphery. The notch 5 and lug 7 mating with each other prevent the driven gear 3 from rotating relative to the heat roller 1.

Figure 5:
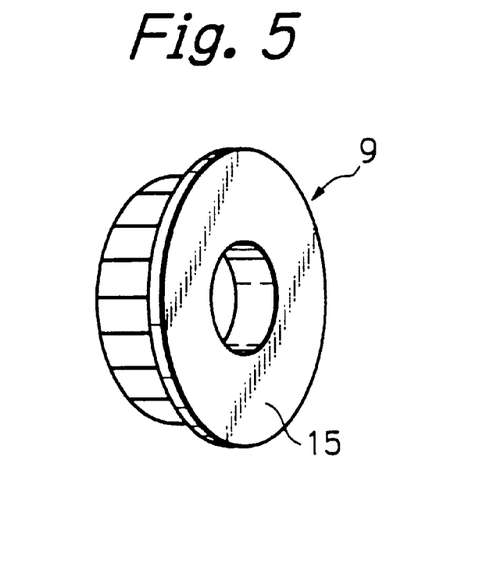
FIG. 5 is a perspective view showing a drive gear held in mesh with the driven gear of FIG. 4.

A drive gear 9 is held in mesh with the driven gear 3 and operatively connected to a drive motor not shown. An annular restricting member 15 (see FIG. 5) is mounted on one end of the drive gear 9 via an E-ring, C-ring or similar stop member 17. The restricting member 15 protrudes radially outward from the drive gear 9 and contacts one end face of the driven gear 3 in order to prevent the heat roller 1 from moving in the axial direction or thrust direction via the driven gear 3. The restricting member 15 should preferably be formed of resin resistive to heat and voltage, e.g., polyimide or PPS (Poly Phenyl Sulfite). While the restricting member 15 of the illustrative embodiment contacts the end face of the driven gear 3 over 1 mm to 2 mm, the contact length should preferably be as long as possible. At the time of assembly, the drive gear 9 is slid along its teeth until the restricting member 15 abuts against the driven gear 3. If desired, the restricting member 15 may be replaced with an annular flange extending radially outward from the drive gear 9 and capable of contacting the driven gear 3.

Figure 7:
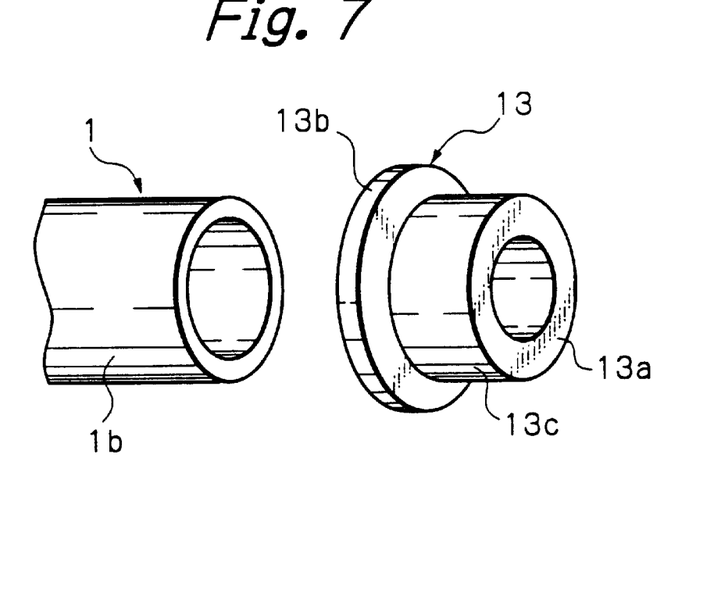
FIG. 7 is an exploded perspective view showing the end portion of the heat roller shown in FIG. 6 together with a bearing.

As shown in FIGS. 6 and 7, the bearing 13 rotatably supporting the other end 1*b* of the heat roller 1 is made up of a flange portion 13*b* affixed to the side wall 10, a tubular body portion 13*c* supporting the end 1*b* of the heat roller 1, and an extension portion 13*a* extending radially inward from the body portion 13. The extension portion 13*a* contacts the end face of the end 1*b* of the heat roller 1, as illustrated, in order to restrict the movement of the roller 1 from one end toward the other end (thrust direction).

Figure 8:
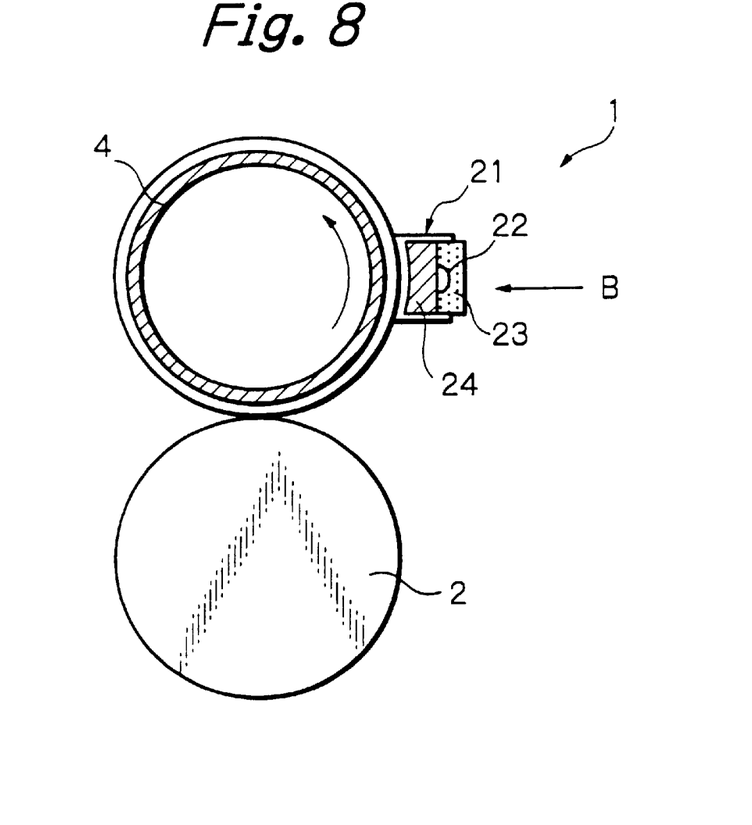
FIG. 8 is a section showing how a temperature sensor contacts the heat roller of the illustrative embodiment.

As shown in FIG. 8, the temperature sensor 22 mentioned earlier and implemented by a thermistor by way of example is held in contact with the outer periphery of the heat roller 1 with the intermediary of a resin sheet 21 and a heat-resistive electric insulation layer, 24. In the illustrative embodiment, a voltage to be applied to the heating layer 4 is controlled on the basis of temperature information output from the temperature sensor 22, so that the surface temperature of the heating layer 4 is controlled to a preselected value.

The resin sheet 21 is implemented by a polyimide tape, PTFE tape or similar heat-resistive material having a small frictional resistance and is held in contact with the parting layer of the heat roller 1. The insulation layer 24 formed on the sheet 21 is formed of, e.g., boron nitride or aluminum nitride. The insulation layer 24 electrically isolates the temperature sensor 22 from the heating layer 4 to which a high voltage is applied, thereby protecting the operator apt to touch circuitry connected to the temperature sensor 22 from an electric shock. Further, a protection layer 23 formed of sponge or similar elastic material is formed on the insulation layer 24 while sandwiching the temperature sensor 22 between it and the insulation layer 24. The sheet 21 is as thin as 0.05 mm to 0.5 mm and protects the insulation layer 24 and protection layer 23 from the outside.

As stated above, in the illustrative embodiment, the restricting member 15 on the drive gear 9 abuts against the driven gear 3 mounted on the heat roller 1 in order to restrict the movement of the roller 1 in the thrust direction. This is in contrast to the conventional arrangement in which a metallic stop ring is fitted on the heat roller 1. In the illustrative embodiment, therefore, the restricting member 15 does not contact the heating layer 4 and obviates a leak. Further, because the illustrative embodiment does not need the holes 104. FIG. 1A, it facilitates assembly on a production line and reduces the production cost.

Moreover, in the illustrative embodiment, the resin sheet 21 intervenes between the insulation layer 24 and the outer periphery (parting layer) of the heat roller 1. Therefore, even when a force pressing the insulation layer 2 against the heat roller 1 (direction B, FIG. 8) acts, it does not scratch the surface of the roller 1 at all. Particularly, the elastic protection layer 23 covering the insulation layer 24 protects the layer 24 from damage ascribable to pressure.

FIGS. 11–15 each shows a particular alternative embodiment of the present invention. In FIGS. 11–15, structural elements identical with the elements shown in 3–10 are designated by identical reference numerals and will not be described specifically in order to avoid redundancy.

Figure 11:
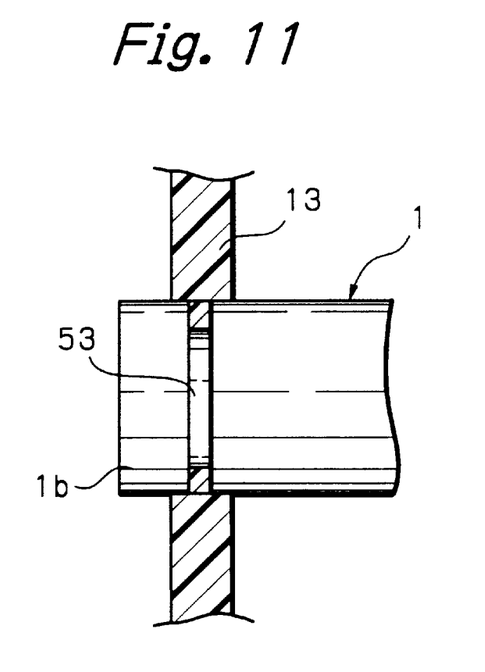
FIGS. 11–15 each shows a particular alternative embodiment of the present invention.

In FIG. 11, the slide bearing 13 is received in an annular groove 53 formed in the other end 1*b* of the heat roller 1. In this configuration, the displacement of the heat roller 1*a* is restricted in both axial directions.

Figure 12:
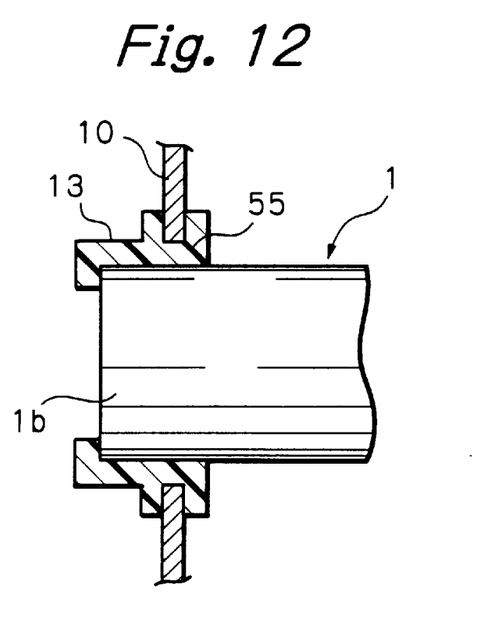

In FIG. 12, the side wall is received in a groove 55 formed in the slide bearing 13. In this configuration, the side wall 10 supports the heat roller 1 via the slide bearing 13 by being opened and closed. This successfully facilitates assembly at the time of production or maintenance.

Figure 13:
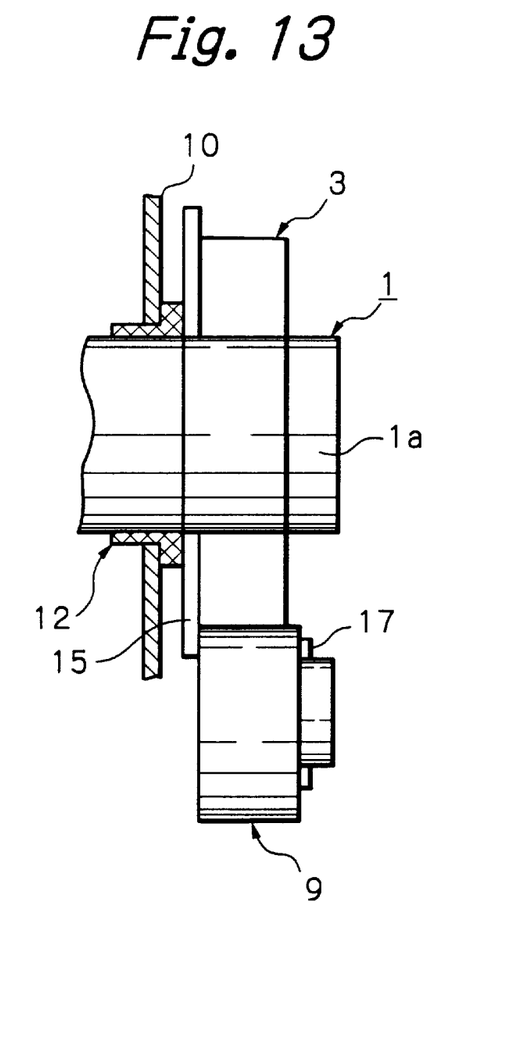

In FIG. 13, the restricting member 15 is provided on the driven gear 3 and held in contact with the end face of the drive gear 9. With this configuration, it is also possible to achieve the advantages described with reference to FIGS. 3–10.

Figure 14:
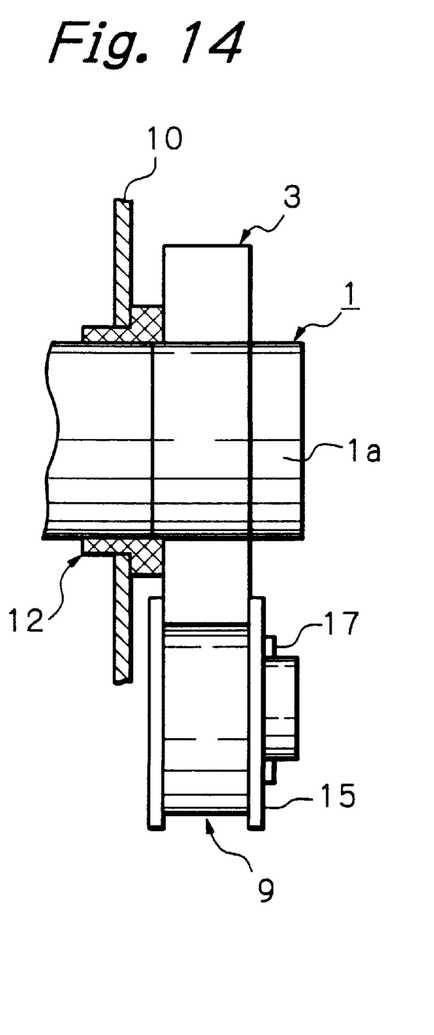

In FIG. 14, the restricting member 15 is provided on each of opposite end faces of the drive gear 9. The two restricting members 15 respectively contact opposite end faces of the driven gear 3, preventing the heat roller 1 from moving in opposite axial directions, i.e., in opposite thrust directions.

Figure 15:
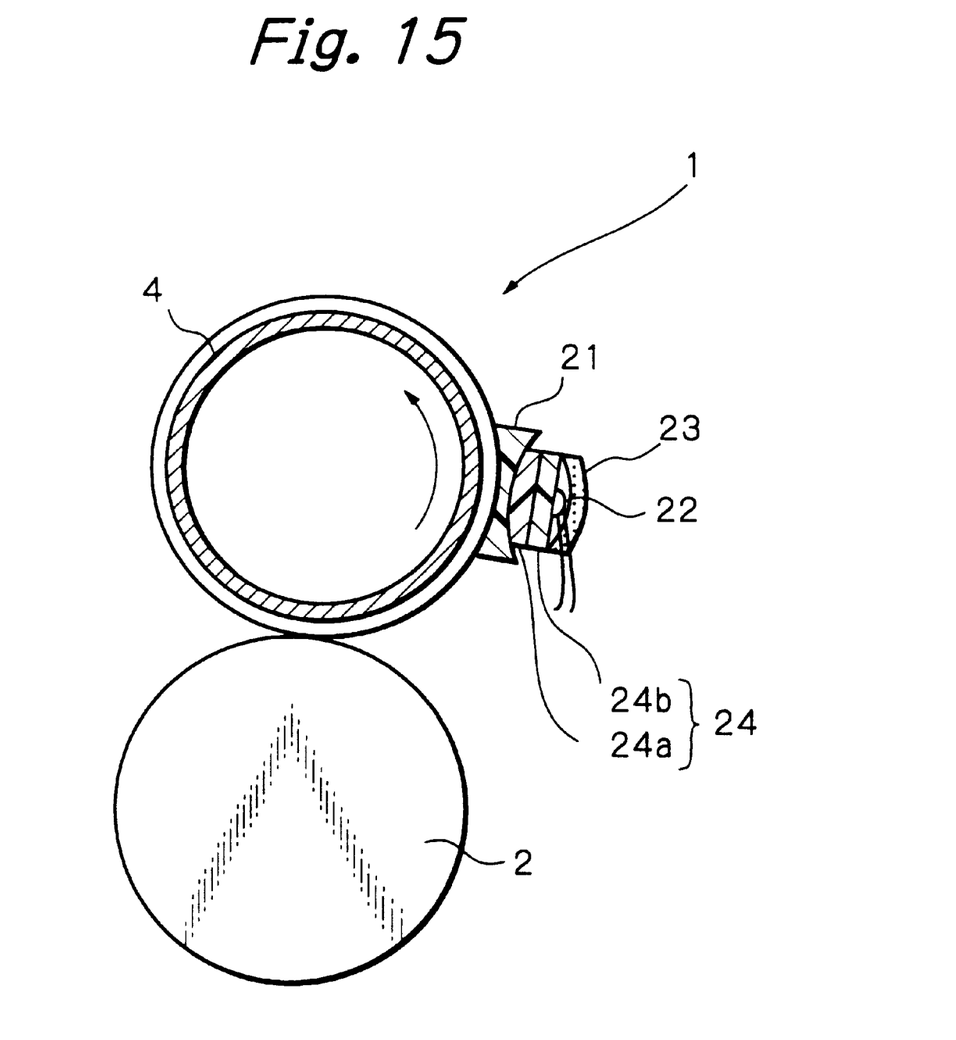

In FIG. 15, the insulation layer 24 is implemented as a laminate of a first and a second insulation layer 24*a* and 24*b*. The two insulation layers 24*a* and 24*b* each is an about 50 μm thick polyimide sheet. The sheet 21 is implemented as a polyimide sheet or a Teflon sheet. These sheets are resistive to a voltage of above 3 kV inclusive and can therefore fully insulate the temperature sensor 22 from the heat roller 1. Consequently, the temperature sensor 22 is free from malfunction ascribable to electrical influence.

In any one of the embodiments shown and described, the heating layer 4 may be formed on the outer periphery of the heat roller 1, if desired. Also, the restricting member or restricting means 15 may be provided on any suitable drive element used to transmit the output torque of the drive motor to the heat roller 1 so long as they can restrict the axial movement of the roller 1.

In summary, it will be seen that the present invention provides a fixing device for an image forming apparatus having various unprecedented advantages, as enumerated below.

(1) Restricting means does not contact a heating body and therefore obviates a leak. Easy assembly on a production line is promoted, and the production cost is reduced.

(2) The restricting means provided on a drive gear abuts against a driven gear in order to restrict the movement of a heat roller. This also prevents the restricting means from contacting the heating body and thereby obviates a leak. Further, because the heat roller does not have to be formed with holes or the like, there can be promoted easy assembly and low cost production.

(3) The displacement of the heat roller is restricted in both axial directions.

(4) A resin sheet intervenes between an electric insulation layer and the outer periphery of the heat roller. Therefore, even when a force pressing the insulation layer against the heat roller acts, it does not scratch the surface of the heat roller. Particularly, an elastic protection layer covering the insulation layer protects the insulation layer from damage ascribable to pressure. In addition, a temperature sensor suffers from a minimum of electrical influence and can sense temperature with accuracy.

(5) The heating body formed on the inner periphery of the heat roller is desirable for surface heating and also obviates a leak to the surface of the heat roller.

Various modifications will become possible for those skilled in the art after receiving the teachings of the present disclosure without departing from the scope thereof.

What is claimed is:

1. A fixing device for thermally fixing a toner image formed on a recording medium, comprising:

a heat roller heated by a heating body;

a press roller facing and pressed against said heat roller and cooperating with said heat roller to thermally fix the toner image when the recording medium is passed therebetween;

a driven gear affixed to one end of said heat roller and a drive gear held in mesh with said driven gear;

restricting means for restricting a movement of said heat roller in a thrust direction, said restricting means being provided on said drive gear and contacting an end face of said driven gear.

2. A fixing device as claimed in claim 1, wherein said heating body is positioned on an inner periphery of said heat roller.

3. A fixing device as claimed in claim 1, wherein said heating body is positioned on an inner periphery of said heat roller.

4. A fixing device as claimed in claim 1, further comprising a bearing rotatably supporting the other end of said heat roller and including a contact portion contacting an end face of said other end, said contact portion restricting a movement of said heat roller in the thrust direction from one end toward the other end.

5. A fixing device as claimed in claim 4, wherein said heating body is positioned on an inner periphery of said heat roller.

6. A fixing device for thermally fixing a toner image carried on a recording medium, comprising:

a heat roller heated by a heating body;

a press roller facing and pressed against said heat roller and cooperating with said heat roller to thermally fix the toner image when the recording medium is passed therebetween;

a resin sheet formed of a low friction material and contacting an outer periphery of said heat roller;

an electric insulation layer formed on said resin sheet;

an elastic protection layer formed on said electric insulation layer; and a temperature sensor sandwiched between said electric insulation layer and said elastic protection layer for sensing a surface temperature of said heat roller.

7. A fixing device as claimed in claim 6, wherein said heating body is positioned on an inner periphery of said heat roller.

8. A fixing device for thermally fixing a toner image formed on a recording medium, comprising:

a heat roller heated by a heating body;

a press roller facing and pressed against said heat roller and cooperating with said heat roller to thermally fix the toner image when the recording medium is passed therebetween;

a driven gear affixed to one end of said heat roller and a drive gear held in mesh with said driven gear; and a restricting member configured to restrict a movement of said heat roller in a thrust direction, said restricting member protruding radially outward from the drive gear and contacting one end face of the driven gear.

9. A fixing device as claimed in claim 8, wherein said heating body is positioned on an inner periphery of said heat roller.

10. A fixing device as claimed in claim 8, further comprising a bearing rotatably supporting the other end of said heat roller and including a contact portion contacting an end face of said other end, said contact portion restricting a movement of said heat roller in the thrust direction from one end toward the other end.

11. A fixing device as claimed in claim 10, wherein said heating body is positioned on an inner periphery of said heat roller.

* * * * *